(12) United States Patent  
Chase

(10) Patent No.: US 11,441,816 B2  
(45) Date of Patent: Sep. 13, 2022

(54) DRAFT INDUCER MOTOR CONTROL SYSTEM

(71) Applicant: Johnson Controls Technology Company, Auburn Hills, MI (US)

(72) Inventor: Thomas D. Chase, Rose Hill, KS (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 261 days.

(21) Appl. No.: 16/195,620

(22) Filed: Nov. 19, 2018

(65) Prior Publication Data

US 2020/0149780 A1    May 14, 2020

Related U.S. Application Data

(60) Provisional application No. 62/760,767, filed on Nov. 13, 2018.

(51) Int. Cl.
*F24H 9/20* (2022.01)
*F24H 9/1881* (2022.01)
*F24H 3/06* (2022.01)

(52) U.S. Cl.
CPC .......... *F24H 9/2085* (2013.01); *F24H 3/065* (2013.01); *F24H 9/1881* (2013.01)

(58) Field of Classification Search
None
See application file for complete search history.

(56) References Cited

U.S. PATENT DOCUMENTS

| 5,410,230 | A | 4/1995 | Bessler et al. |
| 5,438,844 | A | 8/1995 | Hoglund et al. |
| 5,601,071 | A | 2/1997 | Carr et al. |
| 2008/0124667 | A1* | 5/2008 | Schultz ................. F23N 5/203 431/18 |
| 2009/0293867 | A1* | 12/2009 | Chian ................... F04D 27/001 126/99 R |
| 2010/0092275 | A1* | 4/2010 | Savitz ....................... H02P 6/26 415/1 |
| 2010/0223941 | A1* | 9/2010 | Shah ........................ F24F 11/62 62/229 |
| 2011/0111352 | A1* | 5/2011 | Hugghins ........... F24D 19/1084 431/2 |
| 2011/0265779 | A1* | 11/2011 | Vandrak .................... F24H 9/02 126/93 |
| 2014/0110320 | A1* | 4/2014 | Thomas ................... A23P 30/20 210/137 |

(Continued)

FOREIGN PATENT DOCUMENTS

CN    201444571 U  *  4/2010
WO    2018152394       8/2018

*Primary Examiner* — Jason Lau
(74) *Attorney, Agent, or Firm* — Fletcher Yoder, P.C.

(57) ABSTRACT

Embodiments of the present disclosure are directed to a furnace that includes a blower configured to operate to force a fluid through the furnace, a motor having a rated speed, in which the motor is coupled to and configured to actuate the blower, and a controller configured to receive data indicative of an operating characteristic of the furnace and regulate operation of the motor to be at or below an operational speed limit. The controller is configured to set the operational speed limit based on the data indicative of the operating characteristic of the furnace, such that the operational speed limit is less than or equal to the rated speed of the motor.

12 Claims, 6 Drawing Sheets

(56) References Cited

U.S. PATENT DOCUMENTS

2015/0330650 A1    11/2015   Abiprojo et al.
2016/0216718 A1*   7/2016   Powell .................. F04D 27/001
2016/0330285 A1*  11/2016   Brophy ............... H04L 12/2816

* cited by examiner

| HVAC SYSTEM | COMBUSTIBLE FLUID INPUT | HEATED CONDITIONING FLUID OUTPUT | EMISSIONS COMPONENT LIMIT | HEAT OUTPUT | OPERATIONAL SPEED LIMIT |
|---|---|---|---|---|---|
| A | ? | ? | ? | ? | 5000 RPM |
| B | ? | ? | ? | ? | 4500 RPM |
| C | ? | ? | ? | ? | 4000 RPM |

FIG. 6

DRAFT INDUCER MOTOR CONTROL SYSTEM

CROSS REFERENCE TO RELATED APPLICATIONS

This application claims priority from and the benefit of U.S. Provisional Application Ser. No. 62/760,767, entitled "DRAFT INDUCER MOTOR CONTROL SYSTEM", filed Nov. 13, 2018, which is hereby incorporated by reference in its entirety for all purposes.

BACKGROUND

The present disclosure relates generally to heating, ventilation, and/or air conditioning (HVAC) systems, and specifically, relates to adjusting operation of a motor for a component of HVAC systems.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

Environmental control systems are utilized in residential, commercial, and industrial environments to control environmental properties, such as temperature and humidity, for occupants of the respective environments. The environmental control system may control the environmental properties through control of an air flow delivered to and ventilated from the environment. For example, the air flow may be may be conditioned by a heat exchanger of the HVAC system to adjust a temperature of the air flow. Specifically, the heat exchanger may place the air flow in thermal communication with a working fluid flowing through the heat exchanger, in which heat may transfer between the air flow and the working fluid. In some embodiments, the heat exchanger may be coupled to a blower, such as a draft inducer, configured to direct or force the working fluid through the heat exchanger. A motor coupled to the blower may determine a rate at which the working fluid is directed through the heat exchanger. It is now recognized that selecting and/or using a common maximum operational speed of the motor for all HVAC systems may affect a performance of certain HVAC systems.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a furnace includes a blower configured to operate to force a fluid through the furnace, a motor having a rated speed, in which the motor is coupled to and configured to actuate the blower, and a controller configured to receive data indicative of an operating characteristic of the furnace and regulate operation of the motor to be at or below an operational speed limit. The controller is configured to set the operational speed limit based on the data indicative of the operating characteristic of the furnace such that the operational speed limit is less than or equal to the rated speed of the motor.

In another embodiment, a controller for a furnace system includes a tangible, non-transitory, computer-readable medium having computer-executable instructions stored thereon that, when executed, cause a processor to determine an operational speed limit of a motor of the furnace system based on an operating characteristic of the furnace system, in which the motor is coupled to and configured to operate a blower to direct a working fluid through the furnace system, and the operational speed limit is less than or equal to a rated speed of the motor. The instructions, when executed, further cause the processor to regulate an operating speed of the motor to be at or below the operational speed limit.

In another embodiment, a heating, ventilation, and/or air conditioning (HVAC) system includes a heat exchanger configured to place a working fluid in thermal communication with an air flow passing the heat exchanger, a blower configured to force the working fluid through the heat exchanger, and a variable speed motor having a rated speed, in which the variable speed motor is coupled to and configured to actuate the blower. The HVAC system further includes a pressure sensor configured to detect a pressure of the working fluid and transmit a signal indicative of the pressure, and a controller configured to regulate a speed of the variable speed motor to be at or below an operational speed limit based on the signal transmitted by the pressure sensor. The controller is configured to set the operational speed limit based on an operating characteristic of the HVAC system such that the operational speed limit is less than or equal to the rated speed of the variable speed motor.

DRAWINGS

Various aspects of this disclosure may be better understood upon reading the following detailed description and upon reference to the drawings in which:

FIG. 6 is an embodiment of a lookup table that may be referenced by a controller to determine operation of a furnace system, in accordance with an aspect of the present disclosure.

DETAILED DESCRIPTION

Figure 1:
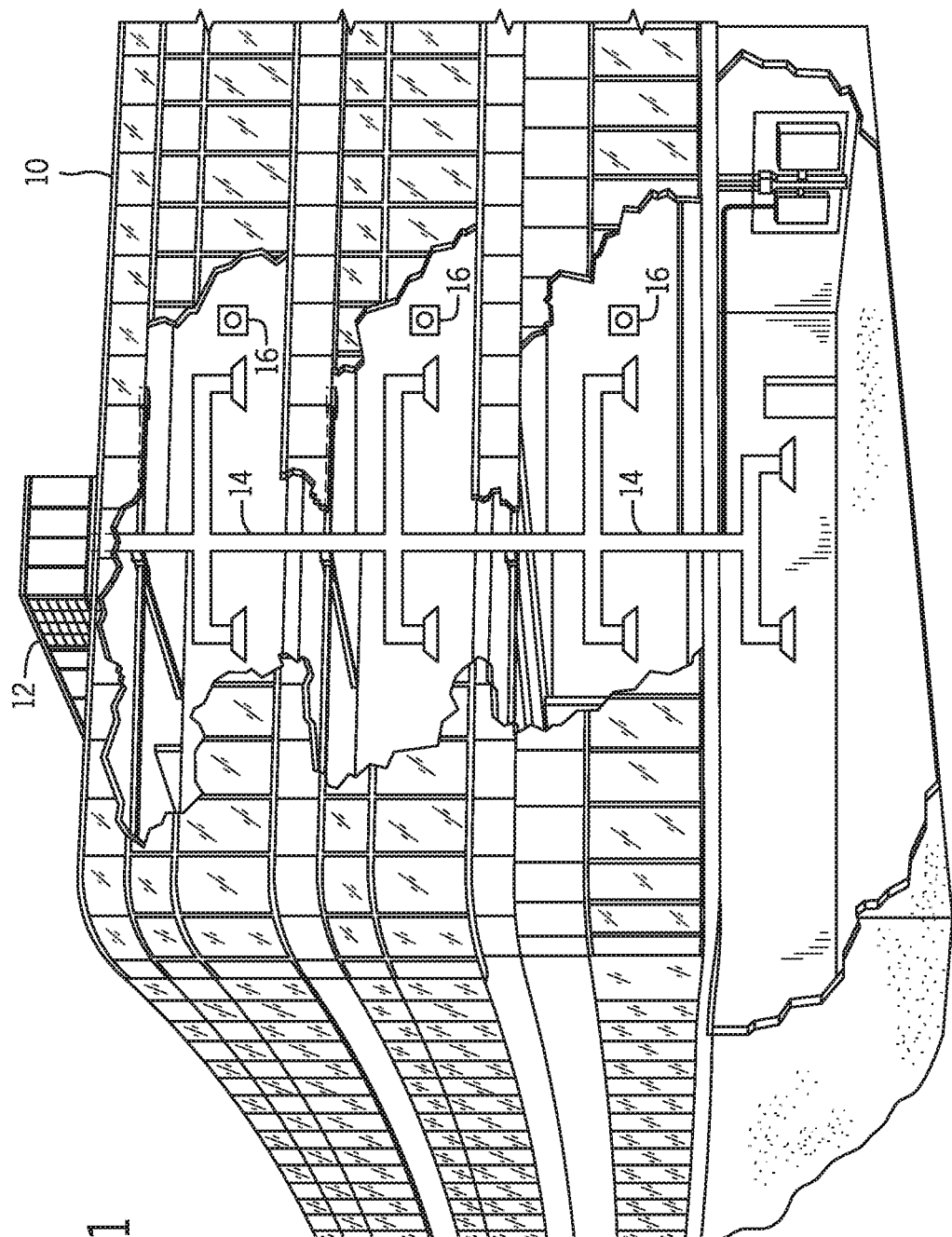
FIG. 1 is a schematic of an embodiment of a system for building environmental management that may employ one or more HVAC units, in accordance with an aspect of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present disclosure is directed to heating, ventilation, and/or air conditioning (HVAC) systems that use a heat exchanger, such as a furnace for conditioning an air flow directed through the HVAC system. For example, a working fluid, such as combustion products, is directed or forced through the heat exchanger via a draft inducer blower, or generally referred to as a blower in this disclosure, while an air flow is directed across the heat exchanger. As such, the working fluid may be placed in thermal communication with the air flow to enable heat to be transferred between the working fluid and the air flow. Furthermore, the blower may direct working fluid out of the HVAC system. That is, after the conditioning fluid is directed through the heat exchanger, the blower may direct the working fluid, such as through conduits, out of the HVAC system, in order to maintain a performance of the HVAC system.

The blower may be coupled to a motor configured to control operation of the blower. The motor may be a variable speed motor and, based on the operating speed of the motor, the blower may force or draw fluid flow through the heat exchanger at a certain rate, such as a certain volumetric flow rate. In some cases, the operating speed, such as a rotational speed, of the motor may be adjusted based on a detected pressure within the HVAC system in order to maintain a rate at which the working fluid is directed through the HVAC system. For example, the motor may be configured to operate at a speed to enable the blower to direct the working fluid through a furnace system at a target rate. Specifically, an increase in a detected pressure differential within the furnace system conduit may indicate a resistance that decreases the rate at which the working fluid is directed through the furnace system below the target rate. Thus, the motor may increase in operating speed to compensate for the increased detected pressure differential and control the blower to increase the rate at which the working fluid is directed through the furnace system, such as toward the target rate. As used herein, a "target rate" refers to a target volumetric flow rate of working fluid directed through the through the heat exchanger, such as a furnace, and out of the HVAC system. However, it should be understood that a different target rate, such as a target rotational speed of the motor, may be implemented in other embodiments consistent with the present techniques.

In some embodiments, a furnace system, a motor and/or a blower used with the furnace system has a rated speed associated therewith. As used herein, a "rated speed" may refer to a maximum speed at which the motor or blower of the furnace system is designed to operate. Different motor or blower models may include different rated speeds. Additionally, in certain embodiments, the furnace system, the motor, and/or the blower used in the furnace system may include a maximum desirable speed associated therewith. As used herein, the "maximum desirable speed" refers to a maximum speed at which the motor or blower may be operated before operation of the furnace system shuts down to maintain a performance and/or an operating condition of the furnace system. As an example, the working fluid may not be heated. The maximum desirable speed may be based on an operating parameter of the furnace system, which may vary in different furnace systems. For example, the operating parameter may be a parameter related to an amount of combustion products produced by the furnace system or a chemical composition of the combustion products. Thus, the operating parameter may be based on a capacity of the furnace system, an application of the furnace system, or any other characteristic of the furnace system.

It should be appreciated that generally, the speed at which the motor is operated may be related to an amount of combustion products removed from the furnace system by the blower. In certain circumstances, the maximum desirable speed is associated with a certain pressure threshold, which may be indicative of a certain amount of resistance blocking the air flow from being directed out of the furnace system. The amount of resistance, which may be caused by a blockage, may indicate that the amount of combustion products is not removed at a sufficient rate from the furnace system. However, when the pressure threshold is reached, increasing the operating speed of the motor may not increase the rate at which the products are removed by a desired amount, may affect a structural integrity of the furnace, and/or may otherwise a performance of the furnace. Therefore, it may be more beneficial to shut off operation of the furnace system at the maximum desirable speed to protect the performance and/or the structural integrity of the furnace system, rather than to continuously increase the operating speed of the motor.

In this manner, operating a motor at a rated speed that is different than the maximum desirable speed of the motor, the blower, and/or the furnace system may affect a performance of the furnace system, the motor, and/or the blower. Therefore, it may be desirable to select a motor model having a rated speed that matches the maximum desirable speed of the furnace system and its components. In some instances, a different blower model may also be selected based on the selected motor model. However, selecting and utilizing a motor or blower from a variety of motors and/or blowers may increase complexity and costs associated with procurement, installation and/or maintenance of furnace systems and HVAC systems. For example, different furnace systems may operate at different capacities, utilize different parts, follow different maintenance procedures, and so forth, to configure each HVAC system based on a particular motor and/or blower having desired operating characteristics.

Thus, in accordance with embodiments of the present disclosure, it is presently recognized that selecting and setting a maximum speed at which a motor and/or blower may operate can limit a complexity and cost of procuring, installing and/or maintaining furnace systems, while also maintaining a desired performance of the furnace systems. Specifically, a controller, such as a control board of the furnace or HVAC system, may control the motor to operate up to a particular operational speed limit that may be less than a rated speed of the motor. For example, the controller may determine and set the operational speed limit based on an operational characteristic of the furnace system, in which the operational speed limit matches the maximum desirable speed of the furnace system. As such, operation of the furnace may be suspended at the set operational speed limit rather than the rated speed of the motor, thereby maintaining a performance and/or desired conditions of the furnace system. Furthermore, the set operational speed limit may be less than the rated speed of the motor in order to maintain a performance of the motor. By enabling adjustment of the maximum operating speed at which the motor may operate, different furnace systems, which may each include a different maximum desirable speed, may utilize the same motor model and/or the same blower model. Therefore, a complexity and cost of procuring, installing, maintaining, and/or configuring a furnace system and/or an HVAC system may be limited.

Turning now to the drawings, FIG. 1 illustrates an embodiment of a heating, ventilation, and/or air conditioning (HVAC) system for environmental management that may employ one or more HVAC units. As used herein, an HVAC system includes any number of components configured to enable regulation of parameters related to climate characteristics, such as temperature, humidity, air flow, pressure, air quality, and so forth. For example, an "HVAC system" as used herein is defined as conventionally understood and as further described herein. Components or parts of an "HVAC system" may include, but are not limited to, all, some of, or individual parts such as a heat exchanger, a heater, an air flow control device, such as a fan, a sensor configured to detect a climate characteristic or operating parameter, a filter, a control device configured to regulate operation of an HVAC system component, a component configured to enable regulation of climate characteristics, or a combination thereof. An "HVAC system" is a system configured to provide such functions as heating, cooling, ventilation, dehumidification, pressurization, refrigeration, filtration, or any combination thereof. The embodiments described herein may be utilized in a variety of applications to control climate characteristics, such as residential, commercial, industrial, transportation, or other applications where climate control is desired.

In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
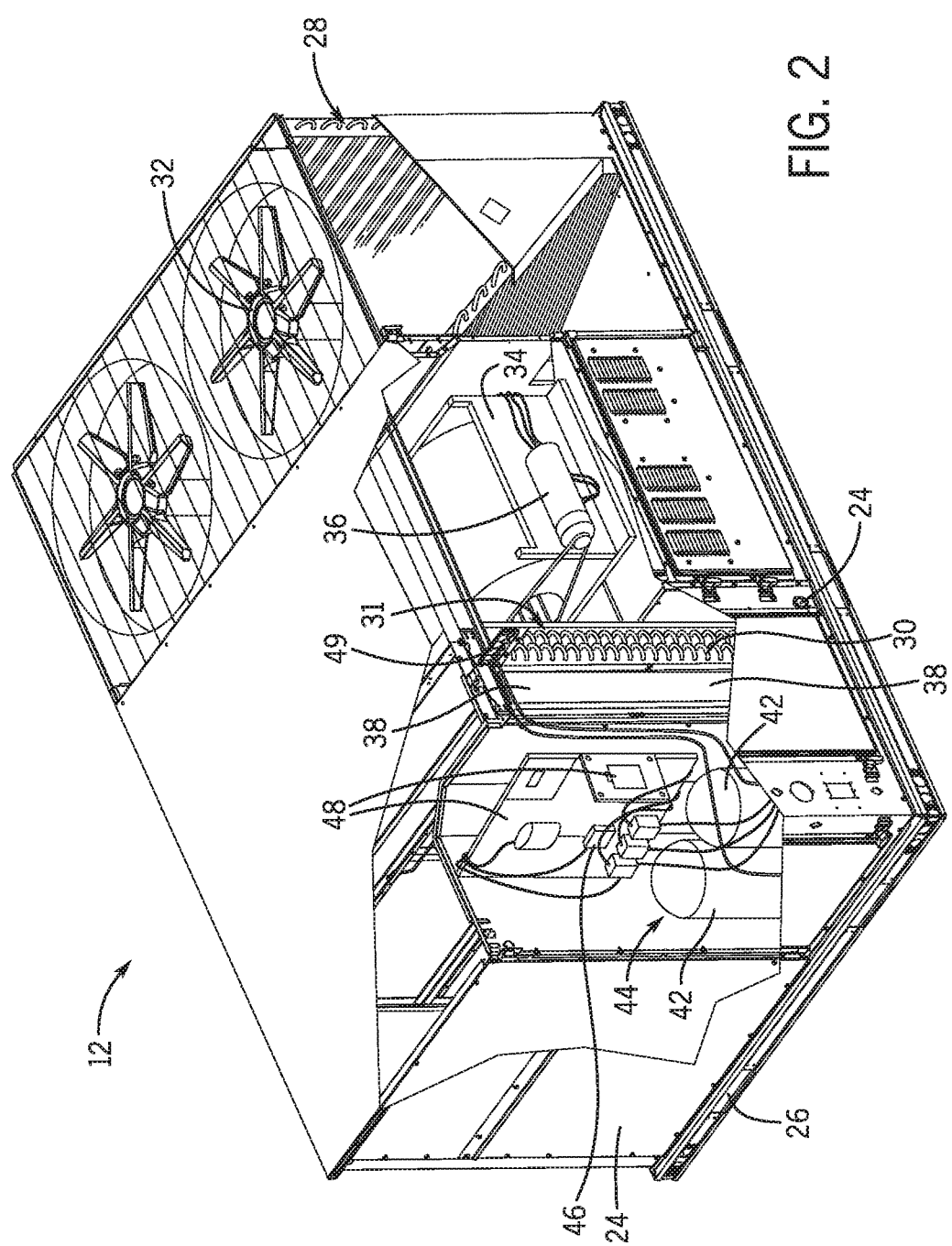
FIG. 2 is a perspective view of an embodiment of an HVAC unit that may be used in the system of FIG. 1, in accordance with an aspect of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant, such as R-410A, through the heat exchangers 28 and 30. The tubes may be of various types, such as multichannel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the HVAC unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms. One or more of these components may be referred to herein separately or collectively as the control device 16. The control circuitry may be configured to control operation of the equipment, provide alarms, and monitor safety switches. Wiring 49 may connect the control board 48 and the terminal block 46 to the equipment of the HVAC unit 12.

Figure 3:
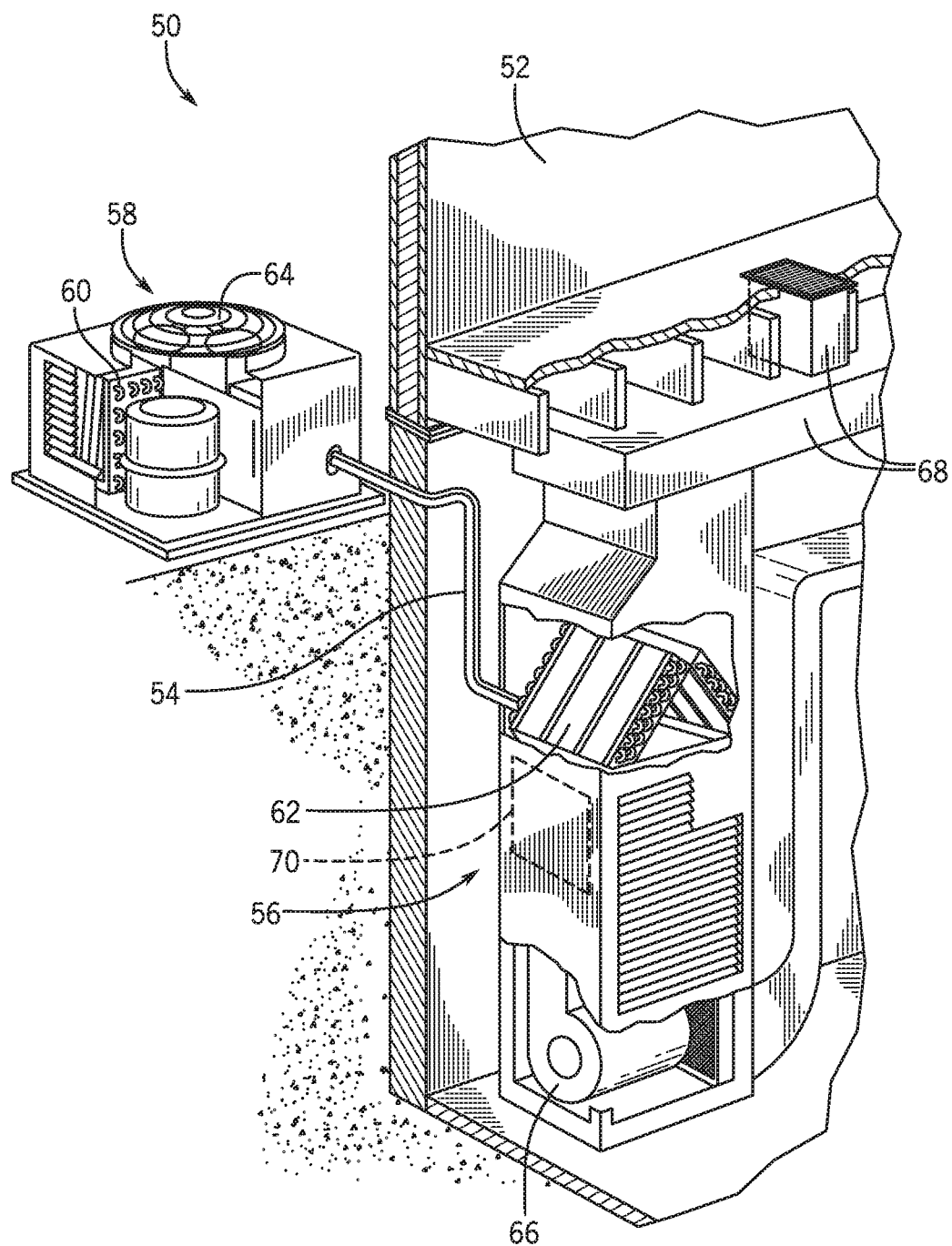
FIG. 3 is a perspective view of an embodiment of a residential heating and cooling system, in accordance with an aspect of the present disclosure.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant, which may be expanded by an expansion device, and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat, or the set point plus a small amount, the residential heating and cooling system 50 may become operative to refrigerate additional air for circulation through the residence 52. When the temperature reaches the set point, or the set point minus a small amount, the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over the outdoor heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace 70 where it is mixed with air and combusted to form combustion products. The combustion products may pass through tubes or piping in a heat exchanger, separate from heat exchanger 62, such that air directed by the blower 66 passes over the tubes or pipes and extracts heat from the combustion products. The heated air may then be routed from the furnace system 70 to the ductwork 68 for heating the residence 52.

It should be appreciated that any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

As discussed above, an HVAC system, such as the HVAC systems of FIGS. 1-4, may be configured to condition an air flow directed through the HVAC system. In particular, a heat exchanging system of the HVAC system may include a heat exchanger configured to place the air flow in thermal communication with a working fluid. The heat exchanging system may also include a blower configured to direct the working fluid through the heat exchanger and then out of the HVAC system. For example, the heat exchanging system may be the furnace system 70 of the HVAC residential heating and cooling system 50 of FIG. 3 configured to increase a temperature of the air flow.

The blower of the heat exchanging system may be controlled by a motor, which may be a variable speed motor, to adjust a rate at which the working fluid is directed through the HVAC system. In some embodiments, the motor includes a maximum speed, or an operational speed limit, at which the motor may operate. In some embodiments, operation of the HVAC system may be suspended or shut down once the motor reaches the operational speed limit. The HVAC system may also include a controller implemented to define and implement the operational speed limit. In particular, the controller may determine the operational speed limit based on an operating characteristic of the HVAC system. The operating characteristic may include an operating parameter of a component of the HVAC system, such as of the blower. Different HVAC systems may include different operating characteristics. Each HVAC system may also include an identifier, such as a code, a model number, and the like, which associates the HVAC system with a particular operating characteristic. Thus, in certain embodiments, the operational speed limit set by the controller may be based on the identifier of the HVAC system.

Figure 4:
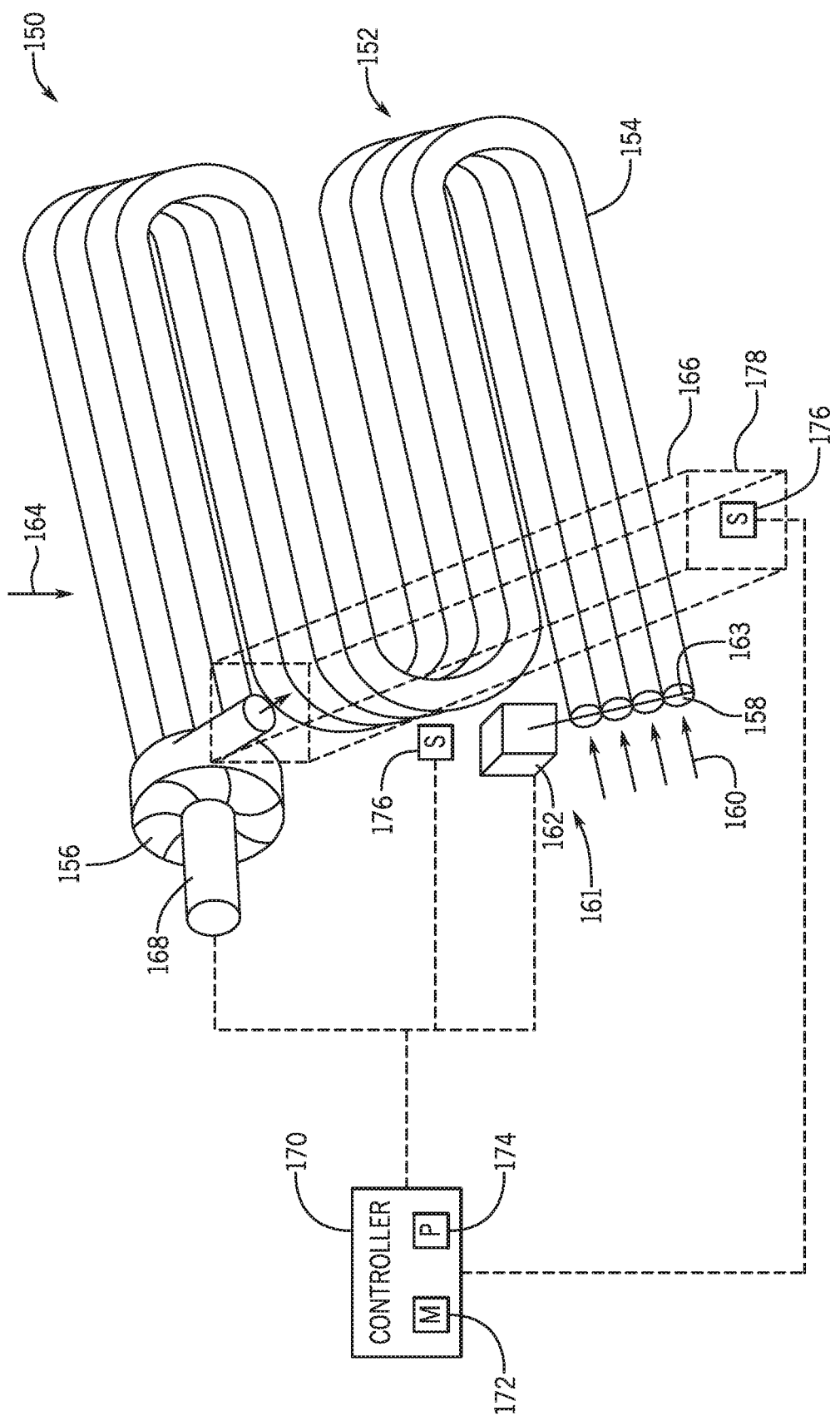
FIG. 4 is a perspective view of an embodiment of a furnace system that includes a controller configured to control operation of the furnace system, in accordance with an aspect of the present disclosure.

FIG. 4 is a schematic view of an embodiment of a heat exchanging system, in accordance with present techniques. In particular, the heat exchanging system is a furnace system 150 that includes a heat exchanger 152, which may heat a working fluid, such as combustion products. The heat exchanger 152 may include multiple heat exchanger tubes or cells 154 through which the working fluid may be directed. A blower 156 may be operated to force or direct the working fluid through the heat exchanger tubes 154. Specifically, when the blower 156 is operated, air may be directed through respective openings 158 of the heat exchanger tubes 154 in a first direction 160. The furnace system 150 may also include a burner assembly 161 disposed adjacent to the openings 158 that is configured to output fuel into the heat exchanger tubes 154. The burner assembly 161 may include a fuel source 162 and one or more burner tubes 163. The fuel source 162 may provide a supply the fuel to the burner tubes 163, which output the fuel into the heat exchanger tubes 154 and combust the fuel and air to form combustion products that flow through the heat exchanger tubes 154. The heat from the combustion products may transfer from the heat exchanger tubes 154 to an air flow passing across the heat exchanger tubes 154, and the air flow may then be supplied to a conditioned space serviced by an HVAC system having the furnace system 150. For purposes of discussion, this disclosure primarily refers to the furnace system 150 as including a gas powered burner assembly that utilizes a combustible fuel to generate the combustion products flowing within the heat exchanger tubes 154. The burner tubes 163, which may include an ignition source, for example, may then ignite the combustible fuel to create the combustion products. However, in additional or alternative embodiments, the furnace system 150 may include other features or components to heat an air flow passing through the furnace system 150.

In any case, the heated working fluid may be drawn through the heat exchanger tubes 154 via the blower 156 while the air flow may be forced or directed across the heat exchanger tubes 154 in a second direction 164 to be placed in thermal communication with the working fluid. That is, heat may be transferred from the working fluid to the air flow when the air flow is directed across the heat exchanger tubes 154. After the working fluid is directed through the heat exchanger tubes 154, the working fluid may be directed out of the furnace system 150 via a conduit 166, such as an exhaust vent, to exhaust the working fluid from the furnace system 150.

As mentioned, it may be desirable to direct the working fluid through the heat exchanger tubes 154 at a particular rate. As shown, the blower 156 is coupled to a motor 168 that is configured to operate at a particular speed to enable the blower 156 to direct the working fluid through the heat exchanger tubes 154 at a target rate. In general, directing the working fluid through the heat exchanger tubes 154 at the target rate may enable the furnace system 150 to operate with desirable characteristics or operating parameters. For example, the target rate of flow of the working fluid through the heat exchanger tubes 154 may be based on a desired rate or amount of heat transfer between the working fluid and the air flow directed across the heat exchanger tubes 154 and/or a desired exit temperature of air flow output by the furnace system 150. The target rate may additionally or alternatively be based on other operating parameters, such as a temperature of the working fluid, a rate at which the air flow is directed across the heat exchanger tubes 154, a chemical or component composition of the working fluid or combustion products, a flow rate of the fuel supplied by the burner assembly 161, a chemical or component composition of the fuel supplied by the burner assembly 161, another operating parameter, or any combination thereof.

The motor 168 may be a variable speed motor, such as an electronically commutated motor (ECM) that varies speeds based on an electronic signal. By adjusting the speed of the motor 168, the rate at which the blower 156 draws the working fluid through the heat exchanger tubes 154 may also be adjusted, such as to achieve the target rate of working fluid flow through the heat exchanger tubes 154.

In some circumstances, a blockage in the conduit 166 and/or within the heat exchanger tubes 154, such as a blockage created by debris, may decrease a size of the flow path through which the working fluid is directed through the furnace system 150. In such circumstances, the volumetric rate at which the blower 156 directs the working fluid through the heat exchanger tubes 154 and out of the furnace system 150 via the conduit 166 may be reduced, such as below the target rate. As a result, an amount of combustion products may not be removed at a sufficient rate out of the furnace system 150 at a current operating speed of the blower 156. In response, the operating speed of the motor 168 may be increased in order to increase the rate at which the blower 156 is drawing the working fluid through the furnace system 150. For example, the operating speed of the motor 168 may be increased in order to elevate the flow rate of the working fluid toward the target rate.

In certain embodiments, operation of the furnace system 150 may be shut off or suspended at a particular operating speed of the motor 168. As discussed herein, shutting off or suspending operation of the furnace system 150 may include shutting off operation of a component of the furnace system 150, such as blocking the fuel source 162 from providing fuel to the burner assembly 161 to heat the working fluid that is circulated in the heat exchanger tubes 154. In one example, the motor 168 may include a rated speed, which may be indicative of a maximum speed that the motor 168 is capable of being operated. In particular, the rated speed may be based on a capacity of the furnace system 150, a particular design specification of the motor 168 and/or the blower 156, may be based on a model, a type, and/or a dimension of the motor 168 and/or the blower 156, or other characteristic associated with the furnace system 150. In a sample embodiment, the speed at which the motor 168 is operating may be indicative of a rate at which combustion products is removed from the furnace system 150. As such, when the operating speed exceeds a certain speed value, the rate at which combustion products are removed may be below a desirable value, which may affect a performance of the furnace system 150. Thus, operation of the furnace system 150 may be shut off or suspended when the operating speed reaches the rated speed to avoid affecting the performance of the furnace system 150. In an additional or an alternative embodiment, operating the motor 168 above the rated speed may adversely affect a performance of the motor 168 and/or the blower 156, such as by causing overheating the motor 168 and/or by compromising the structural integrity of the blower 156. Thus, operation of the furnace system 150 may be shut off or suspended when the operating speed reaches the rated speed to avoid placing undesirable stress on the motor 168 and/or the blower 156.

In another example, the furnace system 150 may include a maximum desirable speed, which is indicative of a maximum speed that the motor 168 may be operated at to maintain a desired performance of the furnace system 150. Operating the motor 168 above the maximum desirable speed to maintain the target rate may affect the performance of the furnace system 150. Specifically, operating the motor 168 above the maximum desirable speed may affect how the heated working fluid is directed out of the furnace system 150. In one example, the maximum desirable speed may be selected based on a capacity of the furnace system 150, an amount of combustion products produced by the furnace system 150, an acceptable limit of an emissions component in the combustion products, or another suitable parameter.

The furnace system 150 may include a controller 170, which may be substantially similar to or may be different than the control board 48 of the HVAC unit 12 of FIGS. 1 and 2, configured to control operation of the furnace system 150. For example, the furnace system 150 may control operation of the burner assembly 161 and/or the motor 168. The controller 170 may include a memory 172 and a processor 174. The memory 172 may include volatile memory, such as random access memory (RAM), and/or non-volatile memory, such as read-only memory (ROM), optical drives, hard disc drives, or solid-state drives to store instructions for operating the furnace system 150. The processor 174 may be configured to execute such instructions. For example, the processor 174 may include one or more application specific integrated circuits (ASICs), one or more field programmable gate arrays (FPGAs), one or more general purpose processors, or any combination thereof.

In particular, the controller 170 may be configured to adjust the operational speed of the motor 168, such as based on feedback from sensors 176 communicatively coupled to the controller 170, to achieve the target rate at which the working fluid is directed through the furnace system 150. For example, the sensors 176 may be disposed on or in the heat exchanger 152, on or in the conduit 166, or on/in another location in the furnace system 150 and may be a pressure sensor configured to detect an operating parameter, such as a pressure differential in the furnace system 150. The controller 170 may receive feedback from the sensors 176 and may generate a signal to operate the motor 168 at an operating speed based on an operating parameter detected by the sensors 176. In one instance, the sensors 176 may detect an increase in pressure differential of the working fluid in the heat exchanger tubes 154 and, in response, may increase the operating speed of the motor 168. Additionally, the sensors 176 may detect a decrease in pressure differential of the working fluid in the heat exchanger tubes 154 and, in response, may decrease the operating speed of the motor 168. As an example, a downstream pressure of the working fluid, such as adjacent to an exit 178 of the conduit, may be detected and an upstream pressure of the working fluid, such as adjacent to where the blower 156 is fluidly coupled to the conduit 166, may be detected. A pressure differential between the downstream pressure and the upstream pressure may be determined by the controller 170. If the determined pressure differential increases above a certain threshold value, the controller 170 may shut off operation of the furnace system 150. In another example, a single pressure value, such as the downstream pressure of the working fluid, may be monitored and used to determine the operating speed of the motor 168. That is, the operating speed of the motor 168 may be configured to increase in response to a detected decrease in the downstream pressure. Furthermore, in response to the downstream pressure dropping below a particular threshold value, the controller 170 may shut off operation of the furnace system 150.

In some embodiments, the controller 170 may select and/or define an operational speed limit of the motor 168, and the controller 170 may instruct the operation of the furnace system 150 to shut off when the operating speed of the motor 168 reaches the operational speed limit. In other words, if, based on the operating parameter detected by the sensors 176, the controller 170 generates a signal or otherwise determines that the furnace system 150 is calling for the motor 168 to operate at an operating speed greater than the operational speed limit, the controller 170 may instead shut off operation of the furnace system 150. The signal may be generated based on an indication by the sensors 176 of the pressure of the working fluid falling below a threshold pressure value or a pressure differential exceeding above another threshold pressure value.

Further, the operational speed limit may be the maximum desirable speed of the furnace system 150 and may be based on an operating characteristic of the furnace system 150. For example, the operating characteristic may include an operating parameter of the furnace system 150, such as a combustible fuel input rating of the burner assembly 161, a combustion air flow rating of the furnace system 150, a working fluid output rating of the furnace system 150, an emissions component limit of the heated working fluid, a heat output rating of the furnace system 150, another operating characteristic, or any combination thereof.

Figure 5:
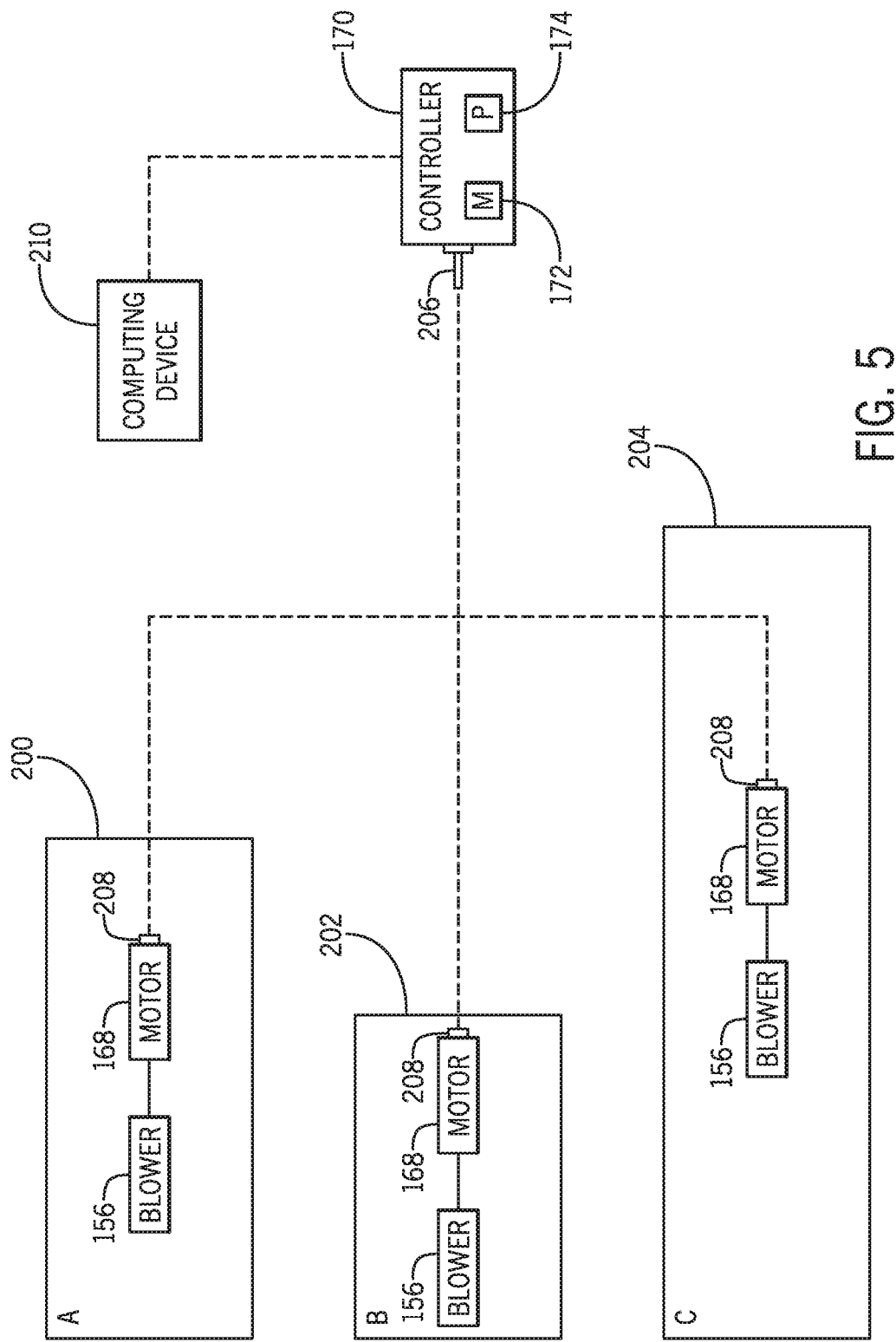
FIG. 5 is a schematic view of an embodiment of a controller configured to couple to different furnace systems, in accordance with an aspect of the present disclosure.

FIG. 5 is a schematic view of an embodiment of the controller 170 configured for use in different heat exchanging systems, such as furnace systems 150. As an example, the controller 170 may be configured for use in any of a first heat exchange system 200, a second heat exchange system 202, and a third heat exchange system 204, each of which may be a furnace system. Each of the heat exchange systems 200, 202, 204 includes the blower 156 coupled to the motor 168. The controller 170 may include a connector 206, which may be an input connection, configured to couple to a mount 208 of the motor 168 and enable the controller 170 to communicate with the motor 168. For example, the connector 206 may be an insert, such as a jumper, that may fit into the mount 208 to couple the connector 206 to the mount 208. In additional or alternative embodiments, the connector 206 may couple with the mount 208 via soldering, crimping, clinching, fastening, clipping, threading, another method, or any combination thereof. In any case, the connector 206 may enable the motor 168 to communicate the operating characteristic to the controller 170.

It should be appreciated that the different heat exchange systems 200, 202, 204 may include different operating parameters. As such, it may be desirable for the heat exchange systems 200, 202, 204 to operate at different operational speed limits. For example, it may be desirable to set the operational speed limit of the motor 168 of the first heat exchange system 200 to 4500 revolutions per minute (RPM), the operational speed limit of the motor 168 of the second heat exchange system 202 to 4000 RPM, and the operational speed limit of the motor 168 of the third heat exchange system 204 to 5000 RPM.

To this end, the controller 170 may receive a signal indicative of an operating characteristic of the particular heat exchange system 200, 202, 204 for which the controller 170 is installed and configured. As an example, the controller 170 may receive the signal from the motor 168 of the respective heat exchange system 200, 202, 204 coupled to the controller 170. In additional or alternative embodiments, the controller 170 may receive the signal from another component of the heat exchange system 200, 202, 204 that may be coupled to the controller 170. In any case, based on the signal and the associated operating characteristic, the controller 170 may determine and set the operational speed limit of the motor 168. As discussed, the operating characteristic may include an operating parameter of the heat exchange system 200, 202, 204. Additionally or alternatively, the operating characteristic may include an identifier of the particular heat exchange system 200, 202, 204. For example, the identifier may be a model number, an identification code, another identifier, or any combination thereof. In certain embodiments, the controller 170 may algorithmically determine the operational speed limit of the motor 168. That is, the controller 170 may calculate the operational speed limit by using the values of certain operating parameters either directly or indirectly. The controller 170 may additionally or alternatively determine the operational speed limit of the motor 168 via a lookup table, chart, graph, or other reference material. In this manner, the controller 170 may determine the operational speed limit by matching the operational speed limit with the corresponding operating characteristic.

As discussed above, the controller 170 may automatically receive the signal from one or more of the sensors 176 when coupled to the heat exchange system 200, 202, 204. However, in additional or alternative embodiments, the controller 170 may receive the signal or other suitable input/feedback via a user input, such as via a computing device 210 communicatively coupled to the controller 170. In this manner, a user may change the operational speed limit set by the controller 170. By way of example, one of the heat exchange systems 200, 202, 204 may be modified such that the operational speed limit originally set by the controller 170 is no longer the maximum desirable speed at which to operate the motor 168. In other words, the user may input a new operational speed limit to override a previously-determined operational speed limit, and the controller 170 may set the new user input value as the operational speed limit.

In this manner, the controller 170 is configured to adjust the respective operating parameters, such as operational speed limits, of the motors 168 of the heat exchange systems 200, 202, 204, such that each operation of the respective heat exchange systems 200, 202, 204 may shut off at a different operational speed limit of the respective motor 168 relative one another. It should be appreciated that the controller 170 may set the operational speed limit of the motor 168 independently of the rated speed of the motor 168, provided that the operational speed limit is less than the rated speed. Therefore, even though each motor 168 of the heat exchange systems 200, 202, 204 may include substantially the same rated speed, the controller 170 may set a different operational speed limit for each respective motor 168. In this manner, each respective heat exchange system 200, 202, 204 may include the same type and/or model of the motor 168, even though each heat exchange system 200, 202, 204 may operate in a different application and/or different conditions.

In certain embodiments, if the controller 170 may determine that the operational speed limit to be set is greater than the rated speed. In such circumstances, the controller 170 may not operate the associated heat exchange system 200, 202, 204 and/or may transmit a signal to the computing device 210 to notify a user that the operational speed limit is improper and/or cannot be set. Thus, the controller 170 may avoid operating the heat exchange system 200, 202, 204 in a manner that that may place undesirable stress on the motor 168.

FIG. 6 is an embodiment of a lookup table 250 that may be used by the controller 170 to determine and/or set the operational speed limit of the motor 168. In some embodiments, the lookup table 250 may be stored on the memory 172, such as a part of a database, to which the controller 170 may refer when determining and/or setting the operational speed limit. The lookup table 250 may include a list of HVAC systems 252, which may be different models of HVAC systems 252, different applications of HVAC systems 252, and the like. The lookup table 250 may also include a list of fields 254 for each of the HVAC systems 252 that includes data for each HVAC system 252. In the illustrated embodiment, the HVAC systems 252 include different heat exchange systems, such as furnace systems, which may include a particular identifier of each heat exchange system. Although three HVAC systems 252 are depicted in FIG. 6, there may be any number of HVAC systems 252 in the lookup table 250. For example, each model of furnace system 150 may correspond with a respective one of the HVAC systems 252. The fields 254 may include different operating parameters, settings, or other characteristics associated with each heat exchange system. Each field 254 may include entries associated with each HVAC system 252. In other words, the lookup table 250 includes entries corresponding to each particular field 254 for each HVAC system 252. Each entry may be a value, such as a numerical value, and/or a description having data associated with the particular field 254 for each HVAC system 252. As an example, the entry for each field 254 of each HVAC system 252 may be determined and assigned by a manufacturer of the associated heat exchange system or by a manufacturer of a certain component of the associated heat exchange system, such as via experimental testing.

In the illustrated embodiment, the fields 254 include values or data associated with fuel input, working fluid output, emissions component limit, heat output, and operational speed limit, but it should be appreciated that additional or alternative fields 254, such as fields associated with another operating characteristic, may be included in the lookup table 250. Of particular focus is an operational speed limit field 256. As previously mentioned, the operational speed limit may be based on the model of the heat exchange system and/or on the other respective fields 254 of the HVAC systems 252. As such, the value of the operational speed limit field 256 may be assigned, such as via an input, based on the particular model, application, and/or condition of the heat exchange system. Additionally or alternatively, the value of the operational speed limit field 256 of a particular heat exchange system may be calculated from a portion of the other values of the other fields 254. Further still, the value of the other fields 254 may be assigned and/or changed via an input, such as a user input, and the value of the operational speed limit field 256 may be adjusted based on the input, such as via new calculations based on the inputted values of the other fields 254.

In any case, upon coupling to a particular heat exchange system, such as to the associated motor 168, the controller 170 may refer to the lookup table 250 to determine the operational speed limit that should be applied during operation of the motor 168. Specifically, the controller 170 may set the operational speed limit of the motor 168 based on the value in the operational speed limit field 256 for the particular HVAC system 252 to which the controller 170 is coupled. Thus, the operational speed limit of the motor 168 is determined via the lookup table 250, rather than a particular component of the heat exchange system. In this manner, the operational speed limit may not be affected by modifications made to the heat exchange system to which the controller 170 is coupled, such as replacement of certain components, as long as the associated entries of the lookup table 250 remain unchanged.

As set forth above, a heat exchanging system, such as a furnace system may include a blower and a heat exchanger. The blower may be configured to direct a working fluid through the heat exchanger to place the working fluid in thermal communication with an air flow directed across the heat exchanger. The blower may also direct the working fluid out of the furnace system to maintain a desirable performance of the furnace system. A variable speed motor may be coupled to the furnace system and may be configured to adjust a rate at which the blower directs the working fluid through the heat exchanger. A controller may couple to the furnace system, such as to a motor configured to rotate the blower, and may be configured to adjust the speed of the variable speed motor. In particular, the controller may determine a speed at which to operate the variable speed motor to match a target rate, such as a target volumetric rate, of the working fluid through the furnace system.

The controller may also determine and set an operational speed limit above which the variable speed motor may no longer operate the blower. That is, during operation, if the controller determines that another parameter of furnace system operation calls for operating the variable speed motor above the operational speed limit, the controller may shut off operation of the furnace system. The controller may set the operational speed limit based on one or more operating characteristics of the furnace system, such as an operating parameter of the furnace system and/or an identifier of the furnace system. In this manner, a different operational speed limit for the motor may be set for a different furnace systems to which the controller is coupled.

While only certain features and embodiments of the disclosure have been illustrated and described, many modifications and changes may occur to those skilled in the art, such as variations in sizes, dimensions, structures, shapes and proportions of the various elements, values of parameters, including temperatures, pressures, and so forth, mounting arrangements, use of materials, colors, orientations, and the like, without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described, such as those unrelated to the presently contemplated best mode of carrying out the disclosure, or those unrelated to enabling the claimed disclosure. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A controller for a furnace system, wherein the controller is configured to:
   determine an operational speed limit of a motor of the furnace system based on an operating characteristic of the furnace system, wherein the motor is coupled to and configured to operate a blower to direct a working fluid through the furnace system, the operational speed limit is less than or equal to a rated speed of the motor, and the rated speed is indicative of an upper speed threshold at which the motor is capable of being operated;
   identify an operating speed for the motor based on additional data indicative of an operating parameter of the furnace system;
   determine the operating speed of the motor based on a target rate at which the blower directs the working fluid through the furnace system; and
   operate the motor at the operating speed in response to determining that the operating speed is at or below the operational speed limit.

2. The controller of claim 1, wherein the controller is configured to reference a lookup table having a plurality of operational speed limit values associated with different applications of the motor and to select an application of the different applications from the lookup table based on the operating characteristic to determine the operational speed limit.

3. The controller of claim 2, wherein the controller is configured to select an operational speed limit value of the plurality of operational speed limit values as the operational speed limit, wherein the operational speed limit value is associated with the application selected from the lookup table.

4. The controller of claim 1, wherein the controller is configured to suspend operation of the furnace system based on a signal requesting operation of the motor above the operational speed limit.

5. The controller of claim 1, wherein the furnace system is one of a plurality of furnace systems, wherein a respective operating characteristic of each furnace system of the plurality of furnace systems is different from respective operating characteristics of other furnace systems of the plurality of furnace systems, and wherein the controller is configured to control each furnace system of the plurality of furnace systems.

6. The controller of claim 1, wherein the controller is configured to determine the operational speed limit via a user input.

7. The controller of claim 1, wherein the controller is configured to increase the operating speed of the motor to increase a rate at which the blower removes the working fluid from the furnace system, and decrease the operating speed of the motor to decrease the rate at which the blower removes the working fluid from the furnace system.

8. A controller for a furnace system, wherein the controller is configured to:
  receive data indicative of an operating characteristic of the furnace system;
  reference supplemental data correlating a plurality of operational speed limit values of a motor of the furnace system with respective associated operating characteristics;
  set an operational speed limit of the motor at an operational speed limit value of the plurality of operational speed limit values based on reference to the supplemental data indicating that the operational speed limit value correlates with the operating characteristic, wherein the motor is configured to operate a blower to direct a fluid through the furnace system, the operational speed limit is less than or equal to a rated speed of the motor, and the rated speed is a maximum speed at which that the motor is capable of being operated;
  determine an operating speed for the motor based on additional data indicative of an operating parameter of the furnace system;
  determine the operating speed is at or below the operational speed limit; and
  operate the motor at the operating speed in response to determining that the operating speed is at or below the operational speed limit.

9. The controller of claim 8, wherein the controller is configured to suspend operation of the furnace system based on determining the operating speed is above the operational speed limit.

10. The controller of claim 8, wherein the controller is configured to identify a model of the furnace system incorporating the data indicative of the operating characteristic, wherein the operating characteristic is a fuel input rating of the furnace system, a heat output rating of the furnace system, a combustion air flow rating of the furnace system, an emissions component limit of an air flow directed through the furnace system, or any combination thereof.

11. The controller of claim 8, wherein the operating parameter comprises a target rate at which the blower removes the fluid from the furnace system, wherein increasing the operating speed of the motor increases a rate at which the blower removes the fluid from the furnace system, and decreasing the operating speed of the motor decreases the rate at which the blower removes the fluid from the furnace system.

12. The controller of claim 8, wherein the operating parameter comprises a pressure of the fluid in the furnace system.

* * * * *